(12) United States Patent
Manz

(10) Patent No.: US 7,598,850 B2
(45) Date of Patent: *Oct. 6, 2009

(54) SYSTEM AND METHOD FOR CENTRALIZED EVENT WARNING NOTIFICATION FOR INDIVIDUAL ENTITIES, AND COMPUTER PROGRAM PRODUCT THEREFOR

(75) Inventor: Paul C. Manz, Matawan, NJ (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 514 days.

This patent is subject to a terminal disclaimer.

(21) Appl. No.: 11/489,800

(22) Filed: Jul. 12, 2006

(65) Prior Publication Data
US 2009/0029672 A1    Jan. 29, 2009

Related U.S. Application Data

(60) Provisional application No. 60/764,386, filed on Jan. 26, 2006.

(51) Int. Cl.
G08B 29/00    (2006.01)

(52) U.S. Cl. .................. 340/506; 340/539.1; 340/3.1; 340/825.36; 340/825.49

(58) Field of Classification Search ................. 340/506, 340/539.1, 3.1, 825.36, 825.49
See application file for complete search history.

(56) References Cited

U.S. PATENT DOCUMENTS 6,018,770 A * 1/2000 Little et al. ................. 709/223
2003/0074672 A1 * 4/2003 Daniels ....................... 725/110
2005/0078647 A1 * 4/2005 Meier et al. ................. 370/338
2006/0141940 A1 * 6/2006 Bloom et al. ................. 455/73
2007/0115116 A1 * 5/2007 Zabek ..................... 340/539.22

* cited by examiner

*Primary Examiner*—Daryl C Pope
(74) *Attorney, Agent, or Firm*—Michael Zelenka; Stephen J. Harbulak

(57) ABSTRACT

An information system, method, and computer program product is provided for the centralized warning of existing or developing significant events and/or threats to affected users carrying a user warning and positioning device, while reporting the location of all user's carrying the user warning and positioning devices of the system to existing command and control systems. The present invention's future event warning capabilities permit those same affected users to be warned of impending events in enough time for the users to take positive actions in response to these events and/or address those events. The system of the present invention includes a pager-like user warning and positioning device, worn by or carried by the individual user, or mounted in a vehicle or vessel, having a geographical positioning means therein, which periodically transmits the geographical location of the individual user, vehicle or vessel, and listens for warning/notification event messages transmitted by a network bridge or situational awareness workstation and threat warning gateway (central processing means). When an event/threat warning is received by the user warning and positioning device, the pager-like user warning and positioning device alerts the user via indicia relative to the event/situation, including audible spoken warnings and instructions on how to react, and may retransmit the event/threat warning to other user warning and positioning devices in the network, provided the threat has not occurred and the event/threat warning has not been previously relayed.

22 Claims, 3 Drawing Sheets

SYSTEM AND METHOD FOR CENTRALIZED EVENT WARNING NOTIFICATION FOR INDIVIDUAL ENTITIES, AND COMPUTER PROGRAM PRODUCT THEREFOR

CROSS REFERENCE TO RELATED APPLICATION

This application claims the benefit of U.S. Provisional Patent Application Ser. No. 60/764,386, entitled "System and Method for Tactical Centralized Event Warning/Notification for Individual Entities" and filed Jan. 26, 2006, which is fully incorporated herein by reference herein.

STATEMENT OF GOVERNMENT INTEREST

The invention described herein may be manufactured, used, imported, sold, and licensed by or for the Government of the United States of America without the payment or any royalty thereon or therefor.

FIELD OF THE INVENTION

The present invention relates to the field of communications notification and warning systems, and more particularly, to a network information system that combines hardware components and a corresponding computer software system to provide a centralized system and method for real-time event warning/notification to numerous individual entities across dispersed locations via one or more central event/threat receiving stations, one or more network bridges, and one or more user warning and positioning devices.

BACKGROUND OF THE INVENTION

One of the salient features of today's modern organizations on a global, national, regional and local level is the ability to leverage information technology to command and control systems in real or near-real time. Advances in the technologies that integrate sensor and communications systems, for instance, facilitate determination of the precise location of mobile vehicles. Also, a plurality of modern information systems permit such location determination, including space, airborne, terrestrial and marine-based command and control systems.

Every vehicle equipped with such a command and control system is able to determine the location using global positioning system (GPS) technology, and then report that vehicle's information to higher command structures/systems using secure wireless linkages. Vehicles equipped with command and control systems (CCS's) also receive a variety of messages from higher command structures/systems, including the known locations of other related vehicles and other unknown or suspected locations of non-related vehicles. CCS's also allow vehicles to send and receive event warning messages and, in turn, permit, for instance, the alerting of related vehicles about such significant events whether developing or in progress.

Though CCS warning messages are often manually generated, there are other information systems in use today, such as weather and tsunami stations, which automatically generate event/threat warning messages without human intervention. One of the military systems that automatically generates a threat warning message is the AN/TPQ-36 Firefinder Counter-fire Radar, which is able to detect projectiles in flight, compute their predicted points of origin and predicted points of impact, and automatically broadcast this information to other systems. The above described system still leaves the most numerous and vulnerable assets, humans, exposed to threats. Thus, there is a need to significantly enhance survivability.

Accordingly, there is a need for a network information system that allows command organizations/structures to know the location in real time of all their remote human assets, such as dismounted soldiers, emergency responders, remote construction crews, etc., as well as warn those assets whenever an event, such as a threat, exists or is inbound. These warnings must be expeditiously received by one or more central hosts, analyzed, distributed to local nodes (network bridges) and individual nodes (user warning and positioning devices), received by same, and processed, to permit sufficient time for potentially affected human assets to alter their protective posture and/or take positive actions in response to the predicted event. In the past, this quick response time has not been achieved in practice. This is understandable when considering the vast number of end systems, and resulting costs required to equip every remote human asset in a field of operations.

Accordingly, there is a need for a system that enables training, simulation, and rehearsal capabilities, along with real-time use by organizations, first responders, public safety, emergency management personnel, etc. for providing warning of harmful events, such as natural disasters, medical emergencies, military threats, homeland security events, and natural disaster incidents. In addition, there is a need for remotely located individuals, such as skiers, hikers, etc. to be provided with warning of harmful events, such as sudden violent weather changes, avalanches, and natural disasters. Further, there is a need for remotely located vehicles and vessels to be provided with a warning of potentially harmful events, such as, for example, violent ocean conditions, sea state changes, and tidal waves.

It is, therefore, an object of the present invention to provide a centralized network information system and method that combines a plurality of components to effectively receive and determine, at a central location, whether or not these predicted events pertain to individual nodes within the system, and distribute a real-time event warning/notification to only the affected individual entities, as well as a computer program product therefor. These individual entities, in turn, can then take action.

It is another object of the present invention to enable the centralized network information system to monitor other connected information systems for externally and internally generated event warning/notification messages.

It is yet another object of the present invention to transmit event warning/notification messages on a secure wireless network whenever these are received.

It is another object of the present invention to retransmit received event warning/notification messages to other user warning devices that may not have received the original message.

It is a further object of the present invention to provide a tailored event warning/notification to a user of the centralized network information system, method and computer program product of the present invention, based on message and user-defined setup parameters.

Still a further object of the present invention is to track the location of each equipped organization, individual human asset and/or vehicle, and periodically report this information to designated command and control organizations/structures, whether space-based, airborne, terrestrial and/or marine-based, using standard or customized messaging formats.

Another object of the present invention is to enable the warning of each equipped organization, individual human asset, vehicle, or other entity every time a significant event is predicted to occur or impact within a given distance from the individual user's location. In doing so, it is desirable that the distance parameter be kept to a minimum, to preclude false positives, but also account for an expected event radius or area as well as for errors in determining the location of the user, and of the predicted point of event or impact.

It is another object of the present invention to provide a secure network system, by using encrypted communications. However, the end system itself should not compromise friendly forces, even when captured intact by an opponent. This means that the information contained in the devices carried by individual assets should be minimal, and of extremely limited utility to an adversary, in the case of a military or confidential application.

Furthermore, it is an object of the present invention to incorporate mechanisms that allow lost or captured devices to be selectively excluded from participating in the network.

It is still another object of the present invention to permit assets/users to carry an unobtrusive user warning and positioning device that is of minimal size. It is also an object of the present invention that the system user warning and positioning device be capable of operating for extended periods of times, on the order of weeks and months, in a tactical environment, with no required user interaction.

It is a further object of the present invention that the centralized network information system, method and computer program product of the present invention be applicable to training, simulation and rehearsal, along with real-time use by organizations, such as first responders, public safety, emergency management personnel, and provide warning of harmful events, such as emergency response, homeland security, natural disaster incidents.

In addition, it is an object of the present invention that the system, method and computer program product be applicable to remotely located individuals, such as skiers, hikers, etc., to be provided warning of harmful events, such as sudden violent weather changes, avalanches, natural disasters, etc. Further, it is an object of the present invention that same be applicable to remotely located vehicles and vessels, so as to provide warning of harmful events, such as violent ocean conditions/sea state changes/tidal waves, for example.

It is also an object of the present invention, in order to overcome the difficulties discussed above, to provide a system and software program product for use in such a system, to automatically facilitate the real-time user warning notification to many individual entities (individual nodes) across dispersed locations.

These and other objects in advantages of this invention will become apparent when considered in light of the following description when taken together with the accompanying drawings.

Accordingly, the present invention provides a robust, versatile and cost-effective solution for event warning/notification for individual entities. Unlike other notification approaches, this method allows for remote, centralized notification of future events or threats to individual nodes affected by an impending event/threat.

SUMMARY OF THE INVENTION

The present invention has been made to solve the problems associated with the prior art inability to cost-effectively provide real-time warning notification to numerous remotely located human assets (users), as described above. In order to achieve the objects of the present invention, as discussed above, the present inventors have earnestly endeavored to create a centralized network information system, method, and computer program product to use in the network information system, to effectively distribute to numerous individuals over a dispersed area, event warning messages in a timely fashion.

In particular, in a first embodiment of the present invention, a centralized network event warning system enabling distribution of event warning messages to one or more individual entities within the network information system is provided comprising:

(a) one or more situational awareness workstation and threat warning gateways capable of receiving event warnings from linked and/or remote sensors, and/or other externally generated event warning messages, each of said situation awareness workstation and threat warning gateway comprising:

a gateway wireless communications means capable of receiving and transmitting data; and situational awareness workstation computing means in communication with the situational awareness workstation and threat warning gateway and wireless communication means, sensors, and command and control systems;

(b) one or more network bridges in communication with the situational awareness workstation and threat warning gateway, each network bridge defining a local node, said network bridges providing a communications interface between individual user warning and positioning devices and the situational awareness workstation and threat warning gateway(s), each of said network bridges comprising:

(i) a network bridge wireless communications means capable of receiving and transmitting data; and (ii) network bridge computer processing means in communication with the network bridge and network wireless communications means, individual user warning devices;

(c) one or more user warning and positioning devices, each user warning and positioning device defining an individual node, each of said devices comprising:

(i) a warning device computer processing means;

(ii) a geographical positioning system (GPS) means capable of calculating the location of the user warning and positioning device, said GPS in communication with the warning device computer processing means;

(iii) a wireless communications means in communication with the warning device computer processing means; and (iv) one or more sensory notification means in communication with the warning device computer processing means;

(d) network situational awareness workstation application program code embodied on a computer readable medium for execution on the situational awareness workstation and threat warning gateway computer processing means capable of authenticating event warning messages, processing and analyzing the event warning messages via an event prediction determination process to determine affected user warning and positioning devices, produce predicted future event warning messages, and distribute future event warning messages to the network bridges comprising:

(i) application program code operable to decode and authenticate a valid event warning message, input directly or indirectly into the situational awareness workstation and threat warning gateway, by verifying the digital signature of the event warning message;

(ii) application program code operable to enable the situational awareness workstation and threat warning gateway to communicate with sensors, individual user warning and positioning devices, and command and control systems, using different networks and protocols;

(iii) application program code operable to input a valid event warning message into an event prediction process, wherein the predicted time of the event is compared with the local time, to determine whether the event will occur at some future time;

(iv) application program code operable to input and authenticate event warning message into an event prediction determination process, thereby analyzing the event warning message to predict a corresponding future event with associated relevant information including predicted event type, location, area impacted, start time, and duration;

(v) application program code operable to determine the user warning and positioning devices to be affected by the future event, by comparing the locale to be affected by the predicted future event with the locale of one or more user warning and positioning devices;

(vi) application program code operable to distribute the predicted future event and associated relevant information to network bridges in communication with user warning and positioning devices that will be affected by the predicted future event;

(vii) application program code operable to convert the format of the predicted future event information, in terms of electronic format and content, to alternative electronic formats, before distribution; and (viii) application program code operable to track the status of user warning and positioning devices with which the network bridge is in communication with;

(e) bridge application program code embodied on a computer readable medium for execution on the network bridge computer processing means for processing event warning messages received from the situational awareness workstation and threat warning gateway, and other external sources, and distributing an authenticated event warning message of an event to occur in the future to affected user warning and positioning devices in communication with the network bridge, said bridge application program code comprising:

(i) application program code operable to automatically verify the authenticity of event warning messages reporting an event to occur in the future, by examining its digital signature, so as to produce either an invalid or valid event warning message;

(ii) application program code operable to send notification to all user warning and positioning devices within the affected area of an authenticated event warning message of an event predicted to occur in the future;

(iii) application program code operable to log off and discard all invalid and elapsed event warning messages;

(iv) application program code operable to input and translate authenticated event warning messages from individual user warning and positioning devices into other message formats utilized by other different command and control systems;

(v) application program code operable to filter event warning messages that should not be sent from one network to the other;

(vi) application program code operable to enable the network bridges to communicate with sensors, individual user warning and positioning devices, and command and control systems, using different networks and protocols; and (vii) application program code operable to issue keys acting as the root certificate authority for all nodes in the network, thereby permitting the network bridges and user warning and positioning devices to authenticate each other;

(f) user warning and positioning device application program code embodied on a computer-readable medium for execution on the user warning device computer processing means in conjunction with the bridge application program code and the situational awareness workstation program code, said user warning device application program code being capable of decoding messages, validating event warning messages, and then issuing a notification of an event predicted to occur in the future in the locale of the user warning device, said user warning device application program code comprising:

(i) application program code operable to authenticate event warning messages by verifying the digital signature of the event warning messages;

(ii) application program code operable to decode incoming coded messages; and (iii) application program code operable to activate one or more of the sensory notification means in the user warning devices when a valid event warning message is received.

In a second embodiment of the present invention, the centralized network event warning system of the first embodiment is provided, wherein the user warning and positioning device application program code further comprises:

application program code operable to query a local cache of messages to determine whether an event warning message has already been relayed; and application program code operable to relay event warning messages to local and individual nodes concerning an event that has not as yet happened and has not as yet been relayed;

In a third embodiment of the present invention, the centralized network event warning system of the first embodiment is provided, wherein the bridge application program code further comprises:

application program code operable to selectively disable or alter individual user warning devices that appear to have been compromised or lost.

In a fourth embodiment of the present invention, the centralized network event warning system of the first embodiment is provided, wherein the bridge application program code further comprises:

application program code operable to reconfigure any parameters in the individual user warning and positioning devices, and application program code therein.

In a fifth embodiment of the present invention, the centralized network event warning system of the first embodiment is provided, wherein the bridge application program code further comprises:

application program code operable to interface one or more of the network bridges with an optional laptop computer running on a conventional operating system.

In a sixth embodiment of the present invention, the centralized network event warning system of the first embodiment is provided, wherein the bridge application program code further comprises:

application program code operable to revoke the digital certificate (digital signature) of a user warning and positioning device.

In a seventh embodiment of the present invention, the centralized network event warning system of the first embodiment above is provided, wherein the user warning and positioning device application program code further comprises:

application program code operable to convert event warning messages to human voice warnings, said human voice warnings comprising instructions on what subsequent action to take based on the event warning message.

In a eighth embodiment of the present invention, the centralized network event warning system of the first embodiment is provided, wherein the user warning and positioning device application program code further comprises:

application program code operable to encrypt outgoing messages.

In a ninth embodiment of the present invention, the centralized network event warning system of the first embodiment is provided, wherein the user warning and positioning device application program code further comprises:

application program code operable to utilize spread-spectrum technology to prevent basic triangulation efforts to locate the user warning and positioning device.

In a tenth embodiment of the present invention, the network event warning system of the first embodiment is provided, wherein the user warning and positioning devices are capable of communicating over wireless systems to the network bridges and other user warning and positioning devices.

In an eleventh embodiment of the present invention, the centralized network event warning system of the first embodiment is provided, wherein the user warning and positioning device application program code further comprises:

application program code operable to reconfigure electronic files stored in the user warning and positioning device.

In a twelfth embodiment of the present invention, the centralized network event warning system of the first embodiment is provided, wherein the bridge application program code further comprises:

application program code operable to connect user warning and positioning devices and/or the network bridges to command and control systems, and/or sensor systems.

In a thirteenth embodiment of the present invention, a computer program product for centralized event warning over a network event warning system is provided, comprising:

(a) network situational awareness workstation application program code embodied on a computer readable medium for execution on a situational awareness workstation and threat warning gateway computer processing means capable of authenticating event warning messages, processing and analyzing the event warning messages via an event prediction determination process to determine affected user warning and positioning devices, produce predicted future event warning messages, and distribute future event warning messages to the affected user warning and positioning devices comprising:

(i) application program code operable to decode and authenticate a valid event warning message, input directly or indirectly into the situational awareness workstation and threat warning gateway, by verifying the digital signature of the event warning message;

(ii) application program code operable to enable the situational awareness workstation and threat warning gateway to communicate with sensors, network bridges, individual user warning and positioning devices, and command and control systems, using different networks and protocols;

(iii) application program code operable to input a valid event warning message into an event prediction process, wherein the predicted time of the event is compared with the local time, to determine whether the event will occur at some future time;

(iv) application program code operable to input and authenticate event warning message into an event prediction determination process, thereby analyzing the event warning message to predict a corresponding future event with associated relevant information including predicted event type, location, area impacted, start time, and duration;

(v) application program code operable to determine the user warning and positioning devices to be affected by the future event, by comparing the locale to be affected by the predicted future event with the locale of one or more user warning and positioning devices in communication with the system;

(vi) application program code operable to distribute the predicted future event and associated relevant information to network bridges in communication with user warning and positioning devices that will be affected by the predicted future event;

(vii) application program code operable to convert the format of the predicted future event information, in terms of electronic format and content, to alternative electronic formats, before distribution; and (viii) application program code operable to track the status of user warning and positioning devices with which the network bridge is in communication with;

(b) bridge application program code embodied on a computer readable medium for execution on the network bridge computer processing means for processing event warning messages received from the situational awareness workstation and threat warning gateway, and other external sources, and distributing an authenticated event warning message of an event to occur in the future to affected user warning and positioning devices in communication with the network bridge, said bridge application program code comprising:

(i) application program code operable to automatically verify the authenticity of event warning messages reporting an event to occur in the future, by examining its digital signature, so as to produce either an invalid or valid event warning message;

(ii) application program code operable to send notification to all user warning and positioning devices within the affected area of an authenticated event warning message of an event predicted to occur in the future;

(iii) application program code operable to log off and discard all invalid and elapsed event warning messages;

(iv) application program code operable to input and translate authenticated event warning messages from individual user warning and positioning devices into other message formats utilized by other different command and control systems;

(v) application program code operable to filter event warning messages that should not be sent from one network to the other;

(vi) application program code operable to enable the network bridges to communicate with individual user warning and positioning devices, and command and control systems, using different networks and protocols; and (vii) application program code operable to issue keys acting as the root certificate authority for all nodes in the network, thereby permitting the network bridges and user warning and positioning devices to authenticate each other; and (c) user warning and positioning device application program code embodied on a computer-readable medium for execution on the user warning device computer processing means in conjunction with the bridge application program code and the situational awareness workstation program code, said user warning device application program code being capable of decoding messages, validating event warning messages, and then issuing a notification of an event predicted to occur in the future in the locale of the user warning and positioning device, said user warning device application program code comprising:

(i) application program code operable to authenticate event warning messages by verifying the digital signature of the event warning messages;
  (ii) application program code operable to decode incoming coded messages; and
  (iii) application program code operable to activate one or more of the sensory notification means in the user warning devices when a valid event warning message is received.

In a fourteenth embodiment of the present invention, the computer program product of the thirteenth embodiment above is provided, wherein the network bridge application program code further comprises:

application program code operable to selectively disable or alter individual user warning and positioning devices that appear to have been compromised or lost.

In a fifteenth embodiment of the present invention, the computer program product of the thirteenth embodiment above is provided, wherein the network bridge application program code further comprises:

application program code operable to reconfigure any parameters in the individual user warning and positioning devices and application program code therein.

In a sixteenth embodiment of the present invention, the computer program product of the thirteenth embodiment above is provided, wherein the network bridge application program code further comprises:

application program code operable to interface one or more network bridges with an optional laptop computer running on a conventional operating system.

In a seventeenth embodiment of the present invention, the computer program product of the thirteenth embodiment is provided, wherein the network bridge application program code further comprises:

application program code operable to revoke the certificate of a user warning and positioning device.

In an eighteenth embodiment of the present invention, a method for receiving and centrally distributing event warnings is provided, said method comprising the steps of:

(1) electronically receiving an event warning message, having a digital signature, at a situational awareness workstation and threat warning gateway (central node);
  (2) examining the digital signature of the event warning message to authenticate the event warning message;
  (3) decoding the authenticated event warning message into a readable format;
  (4) analyzing the authenticated event warning message so as to generate corresponding predicted event and associated relevant information, said predicted event and associated relevant information including event type, event location, area impacted, event start time, and event duration, so as to define an event warning message;
  (5) converting the event warning message to an electronic format and content readable by a network bridge (local node) and a user warning and positioning device (individual node);
  (6) tracking the status of user warning and positioning devices in communication with the local and central nodes, to determine active or inactive status, and location, thereof;
  (7) comparing, in the central node, the time of the predicted event or threat in the event warning message to the local time, to determine whether the event will occur at some future time and, if it will, authenticating the message;
  (8) comparing the locale to be affected by the valid and authenticated event warning message with the locale of all user warning and positioning devices in communication with the local and central nodes, to determine the affected user warning and positioning devices;
  (9) distributing the event warning message by transmission of same from the situational awareness workstation and threat warning gateway to all network bridges in communication with the affected user warning and positioning devices;
  (10) receiving the event warning message in one or more network bridges in communication with the affected user warning and positioning devices, and verifying, in the network bridges, the validity of the event warning message received from the situational awareness workstation and threat warning gateway, so as to authenticate same;
  (11) filtering out event warning messages, at the network bridges, that should not be sent from one network to another, due to lack of validity or authenticity;
  (12) translating the future authenticated event warning messages at the network bridge into other message formats utilized by other different command and control systems and user warning and positioning devices;
  (13) issuing, at the network bridges, keys acting as the root certificate authority for all nodes in the network information system, permitting the network bridges and user warning and positioning devices to authenticate each other;
  (14) distributing the valid, converted and authenticated event warning message from the network bridges to all affected user warning and positioning devices;
  (15) receiving the valid, converted and authenticated event warning message at the affected user warning and positioning devices,
  (16) examining, in the user warning and positioning devices, the digital signature of the incoming event warning message to verify its authenticity;
  (17) discarding all invalid and elapsed warning messages at the affected user warning and positioning devices;
  (18) decoding, in the affected user warning and positioning devices, incoming coded event warning messages; and
  (19) activating one or more notification mechanisms in the affected user warning and positioning devices, including sensory mechanisms, a user notification concerning the received event warning message.

In a nineteenth embodiment of the present invention, the method for receiving and centrally distributing event warnings of the eighteenth embodiment above is provided, further comprising the step of establishing and maintaining communication between the network bridges, sensors, user warning and positioning devices and command and control systems using different networks and protocols.

In an twentieth embodiment of the present invention, the method for receiving and centrally distributing event warnings of the eighteenth embodiment above is provided, further comprising:

sending a query from the affected user warning and positioning devices to a local cache of messages to determine whether the event warning message has already been relayed; and
  relaying, from the affected user warning and positioning devices to other nodes in the network information system, the event warning message concerning an event that has not as yet happened and has not as yet been relayed.

In a twenty first embodiment of the present invention, the method for receiving and tactically distributing event warnings of the eighteenth embodiment above is provided, further comprising converting valid event warning messages to human voice warnings with instructions on what subsequent action to take.

In a twenty second embodiment of the present invention, the method for receiving and centrally distributing event warnings of the eighteenth embodiment above is provided, further comprising sending messages from one or more of the network bridges to one or more user warning and positioning devices, to either alter, reconfigure, or disable one or more of the user warning and positioning devices.

BRIEF DESCRIPTION OF THE DRAWINGS

The accompanying drawings, which are included to provide further understanding of the present invention, and are incorporated in and constitute a part of the specification, illustrating samples of the present invention and together with the description serve to explain the principles of the present invention. The invention will now be described further with reference to the accompanying drawing in which.

DETAILED DESCRIPTION OF THE PREFERRED EMBODIMENTS

The following section describes various preferred embodiments of the present invention, while exemplifying the centralized event warning/notification system, method, and computer program software of the present invention to provide real-time event warning/notification to many individual entities across dispersed locations.

The present invention applies engineering design principles to improve commercial products and military applications for situational awareness and event warning. The present invention is a centralized network information system that combines hardware components, wireless technologies, and computer software programs to provide a centralized system and method for real-time event warning/notification to many individual entities across dispersed locations.

The present invention's architecture is centralized in that a number of fairly robust hosts (situational awareness workstation and threat warning gateways) periodically receive location (geographical position) reports from individual user warning and positioning devices in communication with the system, and event warning messages from sensor networks and CCS's. These centralized hosts maintain a synchronized location database containing position/location data for each user warning and positioning device in the system, thus acting as a virtual unified centralized host. The synchronized location database is used to determine which user warning and positioning devices are in an event/threat area, and then transmit notification/warning messages to only those user warning and positioning devices. The advantage of such a centralized architecture is that it enables the use of simple and inexpensive user warning and positioning devices in the system, by having the devices communicate with a limited number of more complex and protected nodes (i.e., the central and local nodes).

Figure 1:
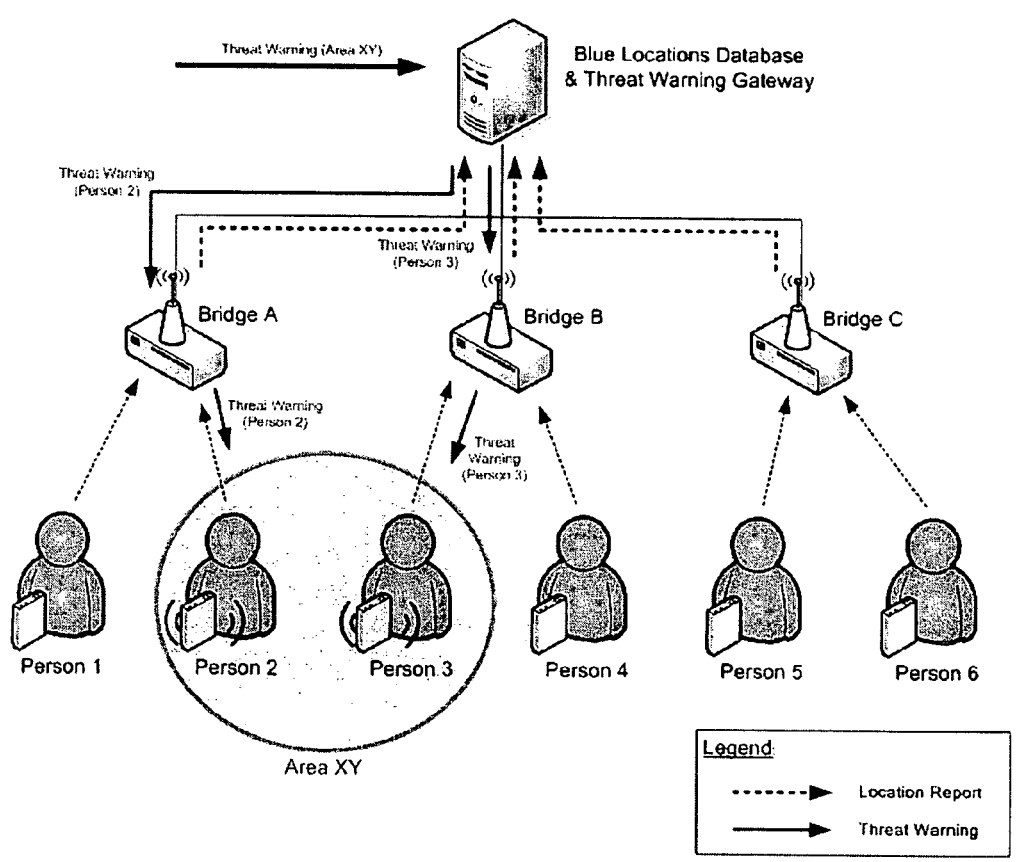
FIG. 1 is a perspective view of the centralized event warning/notification system for of the present invention, illustrating the flow of information from the situational awareness work station and threat warning gateway, to the affiliated network bridges, and all individual user warning and positioning devices affected by the future event.
Figure 2:
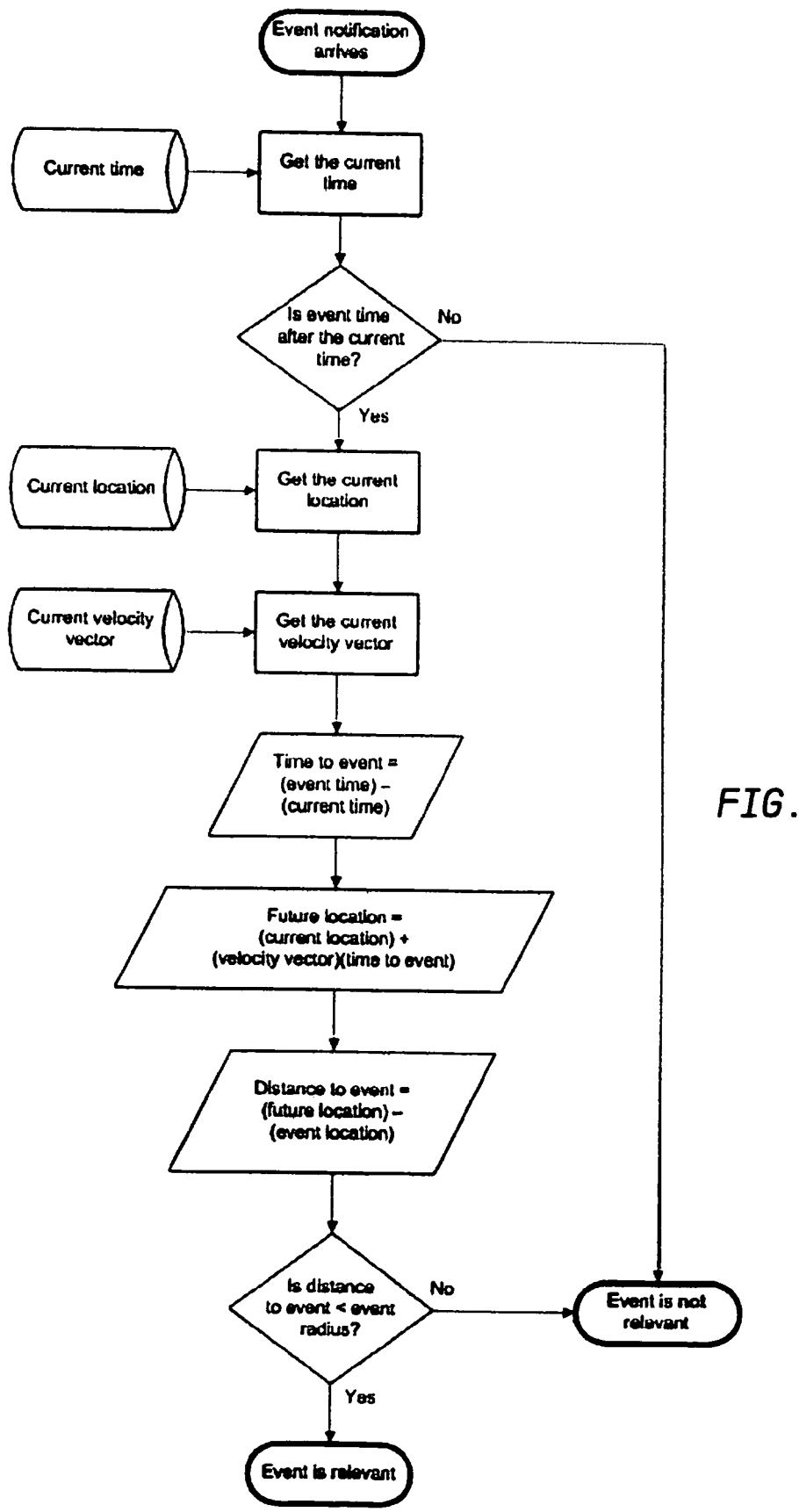
FIG. 2 is a flow diagram, illustrating the functions and steps undertaken by the computer program product of the present invention in receiving and processing future event warning messages at the situational awareness workstation and threat warning gateway, to determine whether the event is relevant and in condition for transmission to the local and affected user warning and positioning devices.
Figure 3:
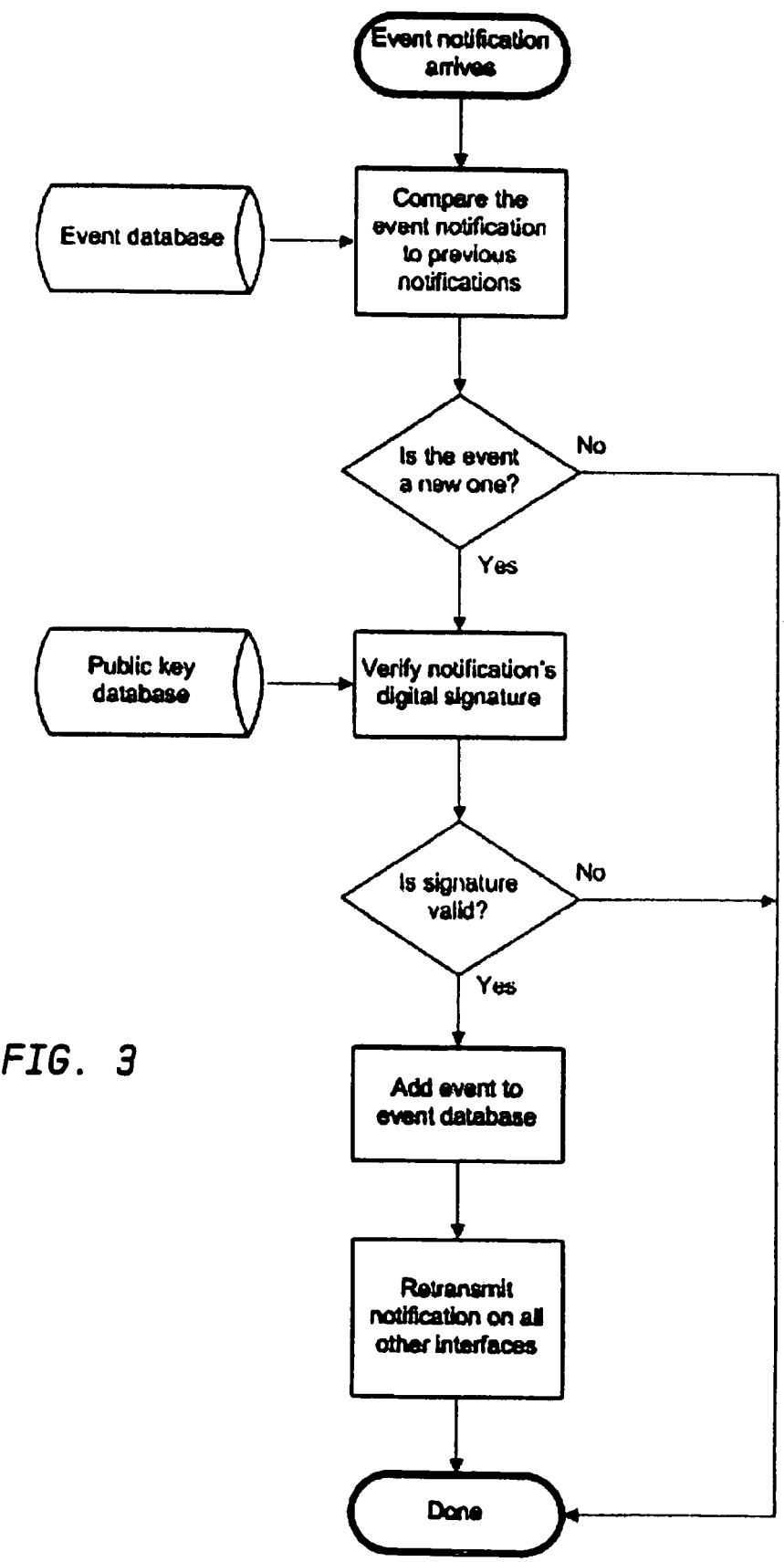
FIG. 3 is a flow diagram, illustrating the decision-making process carried out by the network bridge computer program product of the present invention in determining whether to relay an event warning message received from the situational awareness workstation and threat warning gateways.

Accordingly, FIG. 1 illustrates the centralized warning/notification method and system of the present invention. A database is established that provides the principle data management in communication with network bridge structures (A, B, C, etc.), which in turn are in communication with user warning and positioning devices (1, 2, 3, 4, 5, 6, etc.) which are, for example, carried by users or mounted in vehicles/vessels. Event warning information, e.g., area XY, is delivered to the databases. Subsequently, an event warning message is communicated to bridge A and bridge B by the central situational awareness workstation and threat warning gateway. and in turn communicated only to user warning and positioning devices within the affected area (i.e., the affected user warning and positioning devices.

Location information is generated in the user warning and positioning devices, via a GPS means therein, and periodically communicated to the network bridges, e.g., A, B, C, etc. Such location information received from the user warning and positioning devices is then communicated from the network bridges to the situation awareness workstation and threat warning gateway, and stored in a database in communication therewith. For example, in Area XY there is a threat that is communicated to the database and subsequently location and threat warning/notification information is communicated between individual user warning and positioning devices, the network bridge(s), and the database. More specifically, threat information is communicated only to those assets within the affected or threat area.

For instance, if the system is notified that an artillery shell is in the air and will strike a certain point at a certain time, this message will be processed at the central node to validate the message and determine the affected user warning and positioning devices, and an event warning message distributed to all affected individual nodes (i.e., all user warning and positioning devices) within the system, allowing the individual nodes within the danger radius to alert their users while all other unaffected nodes remain silent. The present invention supports a plurality of network types, e.g., radio, local area networks, etc.

The present invention's system architecture satisfies the present invention's objectives by determining, at a central location (the central node), whether a user, such as a public safety professional or soldier carrying a user warning and positioning device, is inside a predicted future event area. This system and method achieves same by comparing the location of all individual user warning and positioning devices in the system at the time of receipt of the future event warning at the central node with each known event or threat area to determine whether or not an event warning message should be sent to any user warning and positioning devices at that time. In addition, the central node can continually or periodically track the location of all user warning and positioning devices over time, and at a later time up through the predicted future time of the event, if a user warning and positioning device changes geographic locations so as to locate the user within a known event or threat area, send the event warning message to such user warning and positioning device relocated into an affected area.

This is the most computationally intensive calculation required to satisfy the system and method objectives, as errors in this calculation can either erode trust in the system or result in injury, death, or both, of the user. Accordingly, the present invention's architecture permits the ongoing computation of user locations and threat areas at the central node, from the time of receipt of the future event warning message at the central node up to the predicted future event time. This centralization of the sophisticated computational processes of the present invention enables the use of simple and inexpensive user warning and positioning devices, and provides a very efficient transmittion scheme (i.e., a low use of bandwidth).

The present invention further provides a robust solution in the case of the loss, compromise or incapacitation of a user warning and positioning, by affecting only the individual user, such as a public safety professional or soldier, for example. Specifically, according to the present invention, network bridges are utilized to connect the user warning and positioning devices to the command and control and sensor systems, wherein the user warning and positioning devices are not affiliated with a specific network bridge. Instead, each user warning and positioning device is able to exchange messages with any other system component, whether another user warning and positioning device or a network bridge. The present invention is advantageous in that it increases the robustness of the ability to provide warnings within an event area or structure, such as a building, since each node is often multi-homed.

Accordingly, FIG. 1 illustrates the centralized event warning/notification method and system of the present invention. One or more situational awareness workstation and threat warning gateways (hereinafter "gateways") is established that provides the principle data management in communication with network bridge structures (A, B, C, etc.), which in turn are in communication with user warning and positioning devices on assets (1, 2, 3, 4, 5, 6, etc.), being humans, in this example. Event warning information concerning an event locale, e.g., area XY, is delivered to the gateways (i.e., the central nodes). Subsequently, the central nodes generates an event warning message, determines which individual user warning and positioning devices are in the area affected by the event warning message, and then communicates the event warning message to network bridges A and B, which are in communication with the affected user warning and positioning devices. Network bridges A and B, in turn, communicate the event warning message to the affected user warning and positioning devices in communication therewith. Location (position) information of the user warning and positioning devices is periodically generated in the user warning and positioning devices, via a geographical positioning means (GPS) located therein, and periodically communicated to network bridges, e.g., A, B, C, etc., via wireless transmission means' allowing the central nodes to track the user warning and positioning devices, and determine which of same will be affected by the future event.

The location information received from the individual user warning and positioning devices is then communicated from the network bridges to the gateways. For example, as shown in FIG. 1, for Area XY, there is an event warning message that is communicated to the gateway (central node) and, subsequently, location and event warning/notification information, in the form of an event warning message, is communicated from the central node to the affected individual user warning and positioning devices (individual nodes), via the network bridges (local nodes).

The present invention's system includes three types of nodes: the gateways (central nodes), the network bridge devices (local nodes), and user warning and positioning devices (individual nodes), e.g., pager-sized modularized user warning and positioning devices, as illustrated in FIG. 1. The network bridge devices communicate on at least two separate networks. Most commonly, one of these networks is the network over which the pager-size user warning and positioning devices communicate. The other network(s) allows the system to receive externally-generated event warning/notification messages.

The pager-sized user warning and positioning devices communicate wirelessly with the network bridge devices that receive event warning messages from the situational awareness workstation and threat warning gateway, other network bridge devices, other user warning and positioning devices and/or other information systems communicating over a wired or wireless network. Given the need for user warning and positioning devices to communicate with each other, as well as with any network bridges within range, the wireless communications subsystem must support a large number of nodes (i.e., a large number of network bridges and user warning and positioning devices) operating simultaneously within a broadcast environment.

Furthermore, since the system of the present invention can be deployed to hundreds of assets, e.g., soldiers in a theater of operation, emergency response personnel, etc., the wireless communications subsystem must also provide a mechanism for breaking up broadcast domains. The present invention permits different domains to be assigned to the various user warning and positioning devices, so that said devices may operate in close proximity to each other without interfering with each other's receiving and transmitting functions.

The present invention also provides for adaptive power management. The user warning and positioning device transmits at the lowest possible power level in order to conserve energy, as well as to minimize the risk of enemy detection in military or law enforcement applications. Alternately, the user warning and positioning devices are capable of transmitting at a fairly high power level when operating in challenging environments, such as densely developed urban areas or mountainous environments, when the user, e.g., a soldier, is lying prone, or the asset's vehicle has a low profile. Thus, the present inventions communications module's output power is configurable in a flexible manner by the user warning and positioning device's computer processing means.

In a preferred embodiment of the present invention, the user warning and positioning device's configuration file, encryption key, and/or software is updated using a physical or secure wireless connection from a trusted source. This trust, like the validity of received event warning messages, is based on a digital signature. The present invention's physical connections for updates permit the system to be securely reconfigured when a key or device has been compromised.

Also, the present invention takes into consideration the potential exploitation of these user warning and positioning devices by adversaries, in the military or law enforcement applications. Given the fact that the user warning and positioning devices are configured to periodically generate and transmit location reports to the network bridges and on to the gateways and/or CCS's, it may be possible for an enemy to triangulate the position of each user warning and positioning device. To address this threat, the user warning and positioning devices' communications module provides the capability to thwart basic triangulation effort by, for example, utilizing spread-spectrum technologies.

Spread-spectrum techniques are methods in which energy generated at a single frequency is deliberately spread over a wide band of frequencies. This is done for a variety of reasons, including increasing resistance to natural interference or jamming and to prevent hostile detection. A contemporary application of this technique is used in the Single Channel Ground and Airborne Radio System (SINCGARS) by changing frequencies (frequency-hopping) several times per second. In a preferred embodiment of the present invention, the user warning and positioning device similarly uses frequency-hopping spread spectrum techniques to thwart possible triangulation efforts.

The system and method of the present invention provide for the integration of the event information and warning notification. Based upon the present invention's exemplary applications, the resulting general method steps can be understood as follows:

Accordingly, FIG. 1 illustrates the centralized warning/notification method and system of the present invention. A database is established that provides the principle data management in communication with network bridge structures (A, B, C, etc.), which in turn are in communication with user warning and positioning devices on assets (1, 2, 3, 4, 5, 6, etc.), being humans, in this example. Event warning information concerning an affected area, e.g., area XY, is delivered to the databases. Subsequently, an event warning message is generated by the gateway (the central node), communicated to network bridge A and bridge B, and in turn communicated only to the affected user warning and positioning devices on the human assets. Location information is generated in the warning devices, via a GPS means therein, and periodically communicated to associated network bridges, e.g., A, B, C, etc. The location information from the individual user warning and positioning devices is then communicated from the network bridges to the database. For example, there is a threat in Area XY that is communicated to the database, and, subsequently, location and threat warning/notification information, in the form of an event warning message, is communicated from the central node to individual user warning and positioning devices, the network bridges, and a database in communication with the central node. More specifically, the event warning message is communicated to only those assets within the affected or threat area.

The present invention provides for the integration of the event information and warning notification. Based upon the present invention's exemplary applications, the resulting steps can be understood as follows:

Step 1: An event/action occurs that generates a predictable event(s) that will occur in an affected area in the future. (Example: An enemy artillery battery shoots at a friendly unit location.)

Step 2: The event/action is detected and characterized, via direct or indirect means, and information concerning same subsequently fed to the central node, wherein the information is subjected to an event prediction determination process. Potential action detection mechanisms include optical, electromagnetic, radio frequency, and/or acoustic methods that discretely or in combination characterize the initial and/or ongoing action. (Example: A friendly artillery locating radar picks up the incoming enemy artillery round and accurately measures its ballistic-based path of flight).

Step 3: The action characterization information is processed and analyzed in a timely manner. The result of this analysis generates predicted corresponding future event information, including event type, predicted location/area impacted by the event, predicted start time of the event, and predicted duration of the event. (Example: A command and control system associated with the friendly artillery locating radar uses the ballistic-based path of flight and speed of the enemy artillery round to determine its predicted Time of Impact (PTI) and predicted point of impact (PPI) with corresponding affected area footprint considering any ballistic measurement errors).

Step 4, the future event information is sent to the appropriate centralized information repository (the database) containing known asset, e.g., unit warning and positioning device, locations in a timely manner. The asset information repository (database) contains time/date-stamped asset location data. The location of the predicted event is compared against all current known user warning and positioning device locations. A determination is made as to which user warning and positioning devices will be potentially affected, based on each device's location, speed/direction, and time of last asset update relative to the predicted event. (Example: A command and control system compares its centralized database containing current friendly data against PTI and PPI for the enemy artillery round and affected units are identified).

Step 5: Once a determination has been made as to which devices are expected to be affected by the predicted future event, an event warning message is composed, and transmitted to all specific affected assets (i.e., those user warning and positioning devices located in, or predicted to be eventually located in, the affected area at the predicted time of the event) in a timely manner. Based on the communications network architecture and connectivity, these messages can be electronically addressed to individual(s), group(s), and/or combination(s) thereof. While slight dependencies are associated with asset position reporting latencies and centralized computational processes to determine which assets are specifically impacted by the event, this centralized network schema uses the communications network very efficiently as it only sends event warning/notification messages to the specific individual entities affected by the event. This benefit is extremely important in a bandwidth and/or resource constrained communications environment. (Example: A command and control system generates a set of strike warning messages and electronically transmitted using the Internet Protocol addresses for the specific affected units previously identified).

Step 6: Optionally, if either the communications, information network, and/or versions of components within this system are heterogeneous in nature, then a translation of the event warning message may be required, in terms of format and content, to insure compatibility and continuity of timely transmittal as the event warning message makes its way to the electronically addressed assets, e.g., humans carrying user warning and positioning devices. (Example: The command and control system generates a variable-message-format (VMF) based strike warning message. The unit-borne system addressed for receipt of this strike warning message is only able to parse and understand eXtensible Markup Language (XML) based messages. An interim system/device/process is provided to translate the strike warning message from VMF to XML.)

Step 7: The unit-borne system(s) receives and locally parse/process the future event warning message in a timely manner. Upon confirmation of a valid future event warning message that affects the subject asset, the asset-borne user warning and positioning device initiates the appropriate set of subsequent timely actions to notify the affected asset. (Example: A pager-sized warning/notification device carried by an individual dismounted soldier receives and validates an XML-base strike warning message. Computational logic within this device activates several warning/notification mechanisms found within the e).

Step 8: Based on a set of actions selected by the asset-borne user warning and positioning device, the asset is warned/ notified via one or more sensory means prior to and during the time period of the event occurrence. These sensory indicia may include auditory, visual, and/or physical stimulation of an individual's bodily senses. (Example: The pager-sized warning and positioning device both vibrates and sounds an audible alarm upon receiving the event warning message, thereby notifying the affected soldier to change his protective posture prior to impact of the enemy artillery round).

The present invention's network bridges provides two principle functions. First, they provide an interface between the user warning and positioning devices and the external systems that receive, generate and utilize warning/notification information. In this role, the network bridge translates messages received from other systems into event warning messages. The network bridges also translate messages received from the individual user warning and positioning devices into other message formats utilized by other different and multiple command and control systems. Thus, the network bridges also filter messages that should not be sent from one network to the other, e.g., spot reports coming from a terrestrial command and control system.

Second, the network bridges act as management devices for the individual user warning and positioning devices. The network bridges keep track of the status of the user warning and positioning devices with which they have communications contact, and permit the selective disablement or remote alteration of any individual user warning and positioning device that appears to have been compromised or lost. The network bridges are capable of configuring and reconfiguring any parameter in the individual user warning and positioning devices, e.g., by changing the URN of a replacement user warning and positioning device issued to a soldier.

The present invention's network bridges, as well as the central nodes, may communicate with sensor, warning, and command and control systems that use different networks and protocols. For example, the present invention's network bridge can use the internet protocol (IP) at the network layer. Moreover, the network bridge can communicate using both a local area network (LAN) and a point-to-point (PPP) link in order to support both mobile/tactical and fixed installations.

In a preferred embodiment of the present invention, the network bridge devices, and/or the situation awareness workstation and threat warning gateway, are implemented using a laptop computer running on a conventional operating system. The network bridge supports various formats, such as eXtensible Markup Language (XML) messages, over an Ethernet interface, Joint Variable Format Message (JVMF) over a point-to-point protocol (PPP) interface, etc. When a command and control system is connected to a tactical network, e.g., SINCGARS, the CCS connects over its serial port to the Inter-Network Controller (INC), which is a tactical router mounted on the radio's vehicular adapter. The serial connection is established using PPP. Then, the CCS queries the INC to determine its configuration and, if necessary, reconfigures it using the simple network management protocol (SNMP). Thereafter, the CCS exchanges regular IP traffic, e.g., event warning messages, across the serial port. When the CCS is running on a LAN, multicast groups are utilized to transmit packets. By contrast, other sensor and warning systems use other languages, such as extensible markup language (XML) for the messages.

The present invention is applicable to numerous CCS's, such as space, airborne, terrestrial and marine-based system. For instance, multiple terrestrial-based systems can be utilized. For example, some CCS's utilize non-persistent transmission control protocol (TCP) connections to send messages. Thus, such CCS's create a client socket that connects to a server socket on the receiving system, i.e., the present system's network bridge, sends the XML message, and then disconnects. On the other hand, other CCS's create a client socket that connects to the server socket on the receiving system, i.e., the network bridge of the present invention, and then maintains that connection indefinitely. When a message needs to be transmitted, there is no delay in setting up a connection and, if the connection is lost, the CCS will immediately detect the lost connection and try to re-establish it.

The present invention permits message and source authentication, encryption, secure reconfiguration of user warning and positioning devices, and remote zero. Accordingly, the system, method and computer program product of the present invention utilize public key infrastructure (PKI) to mitigate security risks to the system itself. According to a preferred embodiment of the present invention, when an individual user warning and positioning device is initially configured, it is loaded with a plurality, e.g., four, separate encryption keys as follows:

1) the device's own certificate;

2) the device's own private key;

3) the certificate of the network bridge serving as the root certificate authority; and 4) the shared secret key for encrypting messages.

Further, keys are issued by the network bridges that are acting as the root certificate authority for all user warning and positioning devices in the network bridge area of operation. Certificates are signed by this root certificate authority (CA) to allow nodes (such as user warning and positioning devices) to authenticate one another. Moreover, certificate revocation is provided. Thus, the present invention permits both a user warning and positioning device, and its associated network bridge, to authenticate each other, and is particularly important whenever the user warning and positioning device's configuration is remotely modified. As a practical field operation protocol, the only key that should be changed over the air is the shared secret key, but only after the identity of the network bridge has been verified.

Moreover, transmission encryption is provided. Accordingly, the encryption key cannot be read out of the radio transceiver module (of the wireless communication means of the user warning and positioning device) by any means. The entire payload of the data packet is encrypted using the key, and the cyclic redundancy check (CRC) is computed across the ciphertext. A module with the wrong key (or no key) will still receive encrypted data, but this data will be unreadable and useless. Likewise, a module with a key will still receive unencrypted data sent from a module without a key, but the output will be similarly meaningless.

According to the present invention, certain types of event warning messages are authenticated upon receipt. Specifically, in these cases, the user warning and positioning devices will verify the identity of a message sender when the received message instructs the user warning and positioning device to modify its configuration. Thus, authentication is performed according to the following steps:

Step 1: A network bridge sends a configuration message to a specific user warning and positioning device. This message contains a plurality of values, e.g., three, separated or parsed values as follows:

1) the parameter name, e.g., "retransmit";

2) the desired value, e.g., "no"; and 3) the secure hash of the concatenated parameter name, equality sign, and value, e.g., retransmit=no. This secure hash is a hash, e.g., MD5, of the string encrypted using the bridge's private key.

Step 2: The recipient user warning and positioning device automatically looks in its cache for the sender's (the network bridge mentioned in Step 1) public key. If it doesn't find one, the user warning and positioning device automatically sends a request for this key to the sender. The sender subsequently sends a message with its public key, which has been encrypted using the root certificate authority's private key. The recipient that has the root CA's public key, decrypts the key it received and adds it to its cache.

Step 3: The recipient user warning and positioning device automatically computes the hash, e.g., MD5, of the received string, e.g., retransmit=no. The user warning and positioning device then automatically decrypts the received hash using the sender's public key and compares the received and the computed hash values. If they match, the recipient user warning and positioning device knows that the received configuration message is a legitimate authentic message.

According to the present invention, the event warning message reaches only those user warning and positioning devices in the predicted area of the future event, as the event warning message is transmitted only to those network bridges in communication with the affected user warning and positioning devices. In the event, however, that a number of user warning and positioning devices are not in communication contact with a network bridge at a particular point in time, the system of the present invention allows the affected user warning and positioning devices receiving event warning messages to selectively relay future event warning messages, including multiple occurrences.

The present invention permits retransmission of event warning messages, in appropriate instances, depending on the specified configuration of the user warning and positioning devices, e.g., when the event warning message contains an appropriate configuration file. Thus, a specific event warning message can be transmitted once or multiple times. In the case that the event warning message is to be communicated only once, e.g., to prevent redundancy of an event warning message that has already occurred, the system will ensure that it is configured not to allow retransmissions. The system checks, e.g., a local cache, to ensure that the event warning message has not already been relayed. Conversely, in the case of retransmission, the system checks to ensure that the threatened event has not occurred in the past.

The present invention is also particularly robust through its integration of verbal (as opposed to merely sound) warnings. In particular, specific event warning messages are transmitted to the affected user warning and positioning devices, validated and decoded therein, and an appropriate spoken warning broadcast and/or a corresponding audible spoken warning made to the user via the sensory notification means of the device, so that users may hear a human voice broadcast by the user warning and positioning device, instructing the user as to what subsequent actions to take in response to the impending event.

The system, method and computer program product of the present invention are also useful for training, simulation, and rehearsal, along with real-time use by organizations such as first responders, public safety, emergency management personnel with warning of harmful events, such as emergency response, homeland security, natural disaster incidents, etc. For example, the present invention may be utilized to support first responders in disaster areas by tracking their location and allowing a command post to send a danger signal (i.e., an event warning message) to the first responders if an unsafe condition is detected in a particular sector. In such case, as the network area is very limited, the danger signal would only affect the personnel in the danger area such as, perhaps, a building about to collapse.

In another example, the present invention may be utilized to support law enforcement officers by allowing a precinct to position the officers to best deter or respond to criminal activity. Further, the present invention may be utilized to provide remotely located individuals, such as skiers, hikers, etc., with warning of harmful events, such as sudden violent weather changes, avalanches, natural disasters, etc. Further, the present invention may be utilized to provide remotely located vehicles, such as watercraft, with advanced warning of impending harmful events in their locale, such as violent ocean conditions, water spouts, sea state changes, tidal waves, etc.

The present invention is applicable to commercial/non-military, as well as military, applications. Further, the possible events addressed by the system, method and computer program product of present invention range from day-to-day events, such as a street-side performance at a large amusement park, road closing due to construction, etc., to life threatening events, such as the imminent collapse of a building within a disaster area, the imminent detonation of a roadside bomb, etc. The human-computer interface implemented at the user warning and positioning device allows users to reconfigure the settings of the device to determine the content and amount of information that is relayed to user, and can be flexibly configured to address a multitude of events and threats.

Those skilled in the art will recognize that the system, method and computer program product of the present invention has many applications, and that the present invention is not limited to the representative examples disclosed herein. Although illustrative, the embodiments disclosed herein have a wide range of modification, change and substitution that is intended, and in some instances some features of the present invention may be employed without a corresponding use of the other features.

Moreover, the scope of the present invention covers conventionally known variations and modifications to the system components described herein, as would be known by those skilled in the art. Accordingly, it is appropriate that the appended claims be construed broadly and in a manner consistent with the scope of the invention.

The invention claimed is:

1. A centralized network event warning system enabling distribution of event warning messages to one or more individual entities within the network information system is provided comprising:
   (a) one or more situational awareness workstation and threat warning gateways capable of receiving at least one of event warnings from at least one of linked and remote sensors, and other externally generated event warning messages, each of said situation awareness workstation and threat warning gateway comprising:
   a gateway wireless communications means capable of receiving and transmitting data; and
   situational awareness workstation computing means in communication with the situational awareness workstation and threat warning gateway and wireless communication means, sensors, and command and control systems;
   (b) one or more network bridges in communication with the situational awareness workstation and threat warning gateway, each network bridge defining a local node, said network bridges providing a communications interface between individual user warning and positioning devices and the situational awareness workstation and threat warning gateway(s), each of said network bridges comprising:
  (i) a network bridge wireless communications means capable of receiving and transmitting data; and
  (ii) network bridge computer processing means in communication with the network bridge and network wireless communications means, individual user warning devices;
(c) one or more user warning and positioning devices, each user warning and positioning device defining an individual node, each of said devices comprising:
  (i) a warning device computer processing means;
  (ii) a geographical positioning system GPS) means capable of calculating the location of the user warning and positioning device, said GPS in communication with the warning device computer processing means;
  (iii) a wireless communications means in communication with the warning device computer processing means; and
  (iv) one or more sensory notification means in communication with the warning device computer processing means;
(d) network situational awareness workstation application program code embodied on a computer readable medium for execution on the situational awareness workstation and threat warning gateway computer processing means capable of authenticating event warning messages, processing and analyzing the event warning messages via an event prediction determination process to determine affected user warning and positioning devices, produce predicted future event warning messages, and distribute future event warning messages to the network bridges comprising:
  (i) application program code operable to decode and authenticate a valid event warning message, input directly or indirectly into the situational awareness workstation and threat warning gateway, by verifying the digital signature of the event warning message;
  (ii) application program code operable to enable the situational awareness workstation and threat warning gateway to communicate with sensors, individual user warning and positioning devices, and command and control systems, using different networks and protocols;
  (iii) application program code operable to input a valid event warning message into an event prediction process, wherein the predicted time of the event is compared with the local time, to determine whether the event will occur at some future time;
  (iv) application program code operable to input and authenticate event warning message into an event prediction determination process, thereby analyzing the event warning message to predict a corresponding future event with associated relevant information including predicted event type, location, area impacted, start time, and duration;
  (v) application program code operable to determine the user warning and positioning devices to be affected by the future event, by comparing the locale to be affected by the predicted future event with the locale of one or more user warning and positioning devices;
  (vi) application program code operable to distribute the predicted future event and associated relevant information to network bridges in communication with user warning and positioning devices that will be affected by the predicted future event;
  (vii) application program code operable to convert the format of the predicted future event information, in terms of electronic format and content, to alternative electronic formats, before distribution; and
  (viii) application program code operable to track the status of user warning and positioning devices with which the network bridge is in communication with;
(e) bridge application program code embodied on a computer readable medium for execution on the network bridge computer processing means for processing event warning messages received from the situational awareness workstation and threat warning gateway, and other external sources, and distributing an authenticated event warning message of an event to occur in the future to affected user warning and positioning devices in communication with the network bridge, said bridge application program code comprising:
  (i) application program code operable to automatically verify the authenticity of event warning messages reporting an event to occur in the future, by examining its digital signature, so as to produce either an invalid or valid event warning message;
  (ii) application program code operable to send notification to all user warning and positioning devices within the affected area of an authenticated event warning message of an event predicted to occur in the future;
  (iii) application program code operable to log off and discard all invalid and elapsed event warning messages;
  (iv) application program code operable to input and translate authenticated event warning messages from individual user warning and positioning devices into other message formats utilized by other different command and control systems;
  (v) application program code operable to filter event warning messages that should not be sent from one network to the other;
  (vi) application program code operable to enable the network bridges to communicate with sensors, individual user warning and positioning devices, and command and control systems, using different networks and protocols; and
  (vii) application program code operable to issue keys acting as the root certificate authority for all nodes in the network, thereby permitting the network bridges and user warning and positioning devices to authenticate each other;
(f) user warning and positioning device application program code embodied on a computer-readable medium for execution on the user warning device computer processing means in conjunction with the bridge application program code and the situational awareness workstation program code, said user warning device application program code being capable of decoding messages, validating event warning messages, and then issuing a notification of an event predicted to occur in the future in the locale of the user warning device, said user warning device application program code comprising:
  (i) application program code operable to authenticate event warning messages by verifying the digital signature of the event warning messages;
  (ii) application program code operable to decode incoming coded messages; and (iii) application program code operable to activate one or more of the sensory notification means in the user warning devices when a valid event warning message is received.

2. The centralized network event warning system of claim 1, wherein the user warning and positioning device application program code further comprises:
application program code operable to query a local cache of messages to determine whether an event warning message has already been relayed; and
application program code operable to relay event warning messages to local and individual nodes concerning an event that has not as yet happened and has not as yet been relayed.

3. The centralized network event warning system of claim 1, wherein the bridge application program code further comprises:
application program code operable to selectively disable or alter individual user warning devices that appear to have been compromised or lost.

4. The centralized network event warning system of claim 1, wherein the bridge application program code further comprises:
application program code operable to reconfigure any parameters in the individual user warning and positioning devices, and application program code therein.

5. The centralized network event warning system of claim 1, wherein the bridge application program code further comprises:
application program code operable to interface one or more of the network bridges with an optional laptop computer running on a conventional operating system.

6. The centralized network event warning system of claim 1, wherein the bridge application program code further comprises:
application program code operable to revoke the digital certificate (digital signature) of a user warning and positioning device.

7. The centralized network event warning system of claim 1, wherein the user warning and positioning device application program code further comprises:
application program code operable to convert event warning messages to human voice warnings, said human voice warnings comprising instructions on what subsequent action to take based on the event warning message.

8. The centralized network event warning system of claim 1, wherein the user warning and positioning device application program code further comprises:
application program code operable to encrypt outgoing messages.

9. The centralized network event warning system of claim 1, wherein the user warning and positioning device application program code further comprises:
application program code operable to utilize spread-spectrum technology to prevent basic triangulation efforts to locate the user warning and positioning device.

10. The network event warning system of claim 1, wherein the user warning and positioning devices are capable of communicating over wireless systems to the network bridges and other user warning and positioning devices.

11. The centralized network event warning system of claim 1, wherein the user warning and positioning device application program code further comprises:
application program code operable to reconfigure electronic files stored in the user warning and positioning device.

12. The centralized network event warning system of claim 1, wherein the bridge application program code further comprises:
application program code operable to connect at least one of user warning and positioning devices and the network bridges to at least one of command and control systems, and sensor systems.

13. A computer program product for centralized event warning over a network event warning system, comprising:
(a) network situational awareness workstation application program code embodied on a computer readable medium for execution on a situational awareness workstation and threat warning gateway computer processing means capable of authenticating event warning messages, processing and analyzing the event warning messages via an event prediction determination process to determine affected user warning and positioning devices, produce predicted future event warning messages, and distribute future event warning messages to the affected user warning and positioning devices comprising:
(i) application program code operable to decode and authenticate a valid event warning message, input directly or indirectly into the situational awareness workstation and threat warning gateway, by verifying the digital signature of the event warning message;
(ii) application program code operable to enable the situational awareness workstation and threat warning gateway to communicate with sensors, network bridges, individual user warning and positioning devices, and command and control systems, using different networks and protocols;
(iii) application program code operable to input a valid event warning message into an event prediction process, wherein the predicted time of the event is compared with the local time, to determine whether the event will occur at some future time;
(iv) application program code operable to input and authenticate event warning message into an event prediction determination process, thereby analyzing the event warning message to predict a corresponding future event with associated relevant information including predicted event type, location, area impacted, start time, and duration;
(v) application program code operable to determine the user warning and positioning devices to be affected by the future event, by comparing the locale to be affected by the predicted future event with the locale of one or more user warning and positioning devices in communication with the system;
(vi) application program code operable to distribute the predicted future event and associated relevant information to network bridges in communication with user warning and positioning devices that will be affected by the predicted future event;
(vii) application program code operable to convert the format of the predicted future event information, in terms of electronic format and content, to alternative electronic formats, before distribution; and
(viii) application program code operable to track the status of user warning and positioning devices with which the network bridge is in communication with;
(b) bridge application program code embodied on a computer readable medium for execution on the network bridge computer processing means for processing event warning messages received from the situational awareness workstation and threat warning gateway, and other external sources, and distributing an authenticated event warning message of an event to occur in the future to affected user warning and positioning devices in communication with the network bridge, said bridge application program code comprising:

(i) application program code operable to automatically verify the authenticity of event warning messages reporting an event to occur in the future, by examining its digital signature, so as to produce either an invalid or valid event warning message;

(ii) application program code operable to send notification to all user warning and positioning devices within the affected area of an authenticated event warning message of an event predicted to occur in the future;

(iii) application program code operable to log off and discard all invalid and elapsed event warning messages;

(iv) application program code operable to input and translate authenticated event warning messages from individual user warning and positioning devices into other message formats utilized by other different command and control systems;

(v) application program code operable to filter event warning messages that should not be sent from one network to the other;

(vi) application program code operable to enable the network bridges to communicate with individual user warning and positioning devices, and command and control systems, using different networks and protocols; and (vii) application program code operable to issue keys acting as the root certificate authority for all nodes in the network, thereby permitting the network bridges and user warning and positioning devices to authenticate each other; and (c) user warning and positioning device application program code embodied on a computer-readable medium for execution on the user warning device computer processing means in conjunction with the bridge application program code and the situational awareness workstation program code, said user warning device application program code being capable of decoding messages, validating event warning messages, and then issuing a notification of an event predicted to occur in the future in the locale of the user warning and positioning device, said user warning device application program code comprising:

(i) application program code operable to authenticate event warning messages by verifying the digital signature of the event warning messages;

(ii) application program code operable to decode incoming coded messages; and (iii) application program code operable to activate one or more of the sensory notification means in the user warning devices when a valid event warning message is received.

14. The computer program product of claim 13, wherein the network bridge application program code further comprises:
application program code operable to selectively disable or alter individual user warning and positioning devices that appear to have been compromised or lost.

15. The computer program product of claim 13, wherein the network bridge application program code further comprises:

application program code operable to reconfigure any parameters in the individual user warning and positioning devices and application program code therein.

16. The computer program product of claim 13, wherein the network bridge application program code further comprises:
application program code operable to interface one or more network bridges with an optional laptop computer running on a conventional operating system.

17. The computer program product of claim 13, wherein the network bridge application program code further comprises:
application program code operable to revoke the certificate of a user warning and positioning device.

18. A method for receiving and centrally distributing event warnings, said method comprising the steps of:

(1) electronically receiving an event warning message, having a digital signature, at a situational awareness workstation and threat warning gateway (central node);

(2) examining the digital signature of the event warning message to authenticate the event warning message;

(3) decoding the authenticated event warning message into a readable format;

(4) analyzing the authenticated event warning message so as to generate corresponding predicted event and associated relevant information, said predicted event and associated relevant information including event type, event location, area impacted, event start time, and event duration, so as to define an event warning message;

(5) converting the event warning message to an electronic format and content readable by a network bridge (local node) and a user warning and positioning device (individual node);

(6) tracking the status of user warning and positioning devices in communication with the local and central nodes, to determine active or inactive status, and location, thereof;

(7) comparing, in the central node, the time of the predicted event or threat in the event warning message to the local time, to determine whether the event will occur at some future time and, if it will, authenticating the message;

(8) comparing the locale to be affected by the valid and authenticated event warning message with the locale of all user warning and positioning devices in communication with the local and central nodes, to determine the affected user warning and positioning devices;

(9) distributing the event warning message by transmission of same from the situational awareness workstation and threat warning gateway to all network bridges in communication with the affected user warning and positioning devices;

(10) receiving the event warning message in one or more network bridges in communication with the affected user warning and positioning devices, and verifying, in the network bridges, the validity of the event warning message received from the situational awareness workstation and threat warning gateway, so as to authenticate same;

(11) filtering out event warning messages, at the network bridges, that should not be sent from one network to another, due to lack of validity or authenticity;

(12) translating the future authenticated event warning messages at the network bridge into other message formats utilized by other different command and control systems and user warning and positioning devices;

(13) issuing, at the network bridges, keys acting as the root certificate authority for all nodes in the network information system, permitting the network bridges and user warning and positioning devices to authenticate each other;

(14) distributing the valid, converted and authenticated event warning message from the network bridges to all affected user warning and positioning devices;

(15) receiving the valid, converted and authenticated event warning message at the affected user warning and positioning devices,

(16) examining, in the user warning and positioning devices, the digital signature of the incoming event warning message to verify its authenticity;

(17) discarding all invalid and elapsed warning messages at the affected user warning and positioning devices;

(18) decoding, in the affected user warning and positioning devices, incoming coded event warning messages; and

(19) activating one or more notification mechanisms in the affected user warning and positioning devices, including sensory mechanisms, a user notification concerning the received event warning message.

19. The method for receiving and centrally distributing event warnings of claim 18, further comprising the step of establishing and maintaining communication between the network bridges, sensors, user warning and positioning devices and command and control systems using different networks and protocols.

20. The method for receiving and centrally distributing event warnings of claim 18, further comprising:

sending a query from the affected user warning and positioning devices to a local cache of messages to determine whether the event warning message has already been relayed; and relaying, from the affected user warning and positioning devices to other nodes in the network information system, the event warning message concerning an event that has not as yet happened and has not as yet been relayed.

21. The method for receiving and tactically distributing event warnings of claim 18, further comprising converting valid event warning messages to human voice warnings with instructions on what subsequent action to take.

22. The method for receiving and centrally distributing event warnings of claim 18, further comprising sending messages from one or more of the network bridges to one or more user warning and positioning devices, to either alter, reconfigure, or disable one or more of the user warning and positioning devices.

* * * * *

UNITED STATES PATENT AND TRADEMARK OFFICE
CERTIFICATE OF CORRECTION

PATENT NO. : 7,598,850 B2 Page 1 of 1
APPLICATION NO. : 11/489800
DATED : October 6, 2009
INVENTOR(S) : Paul C. Manz It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 561 days.

Signed and Sealed this

Twenty-eighth Day of September, 2010

David J. Kappos
*Director of the United States Patent and Trademark Office*